United States Patent [19]

Kokado

[11] Patent Number: 4,720,825
[45] Date of Patent: Jan. 19, 1988

[54] OPTICAL DATA REPRODUCING DEVICES HAVING IMPROVED TRICK PLAY CAPABILITY

[75] Inventor: Hiroshi Kokado, Tokyo, Japan

[73] Assignee: Asahi Kogaku Kogyo Kabushiki Kaisha, Japan

[21] Appl. No.: 696,742

[22] Filed: Jan. 31, 1985

[30] Foreign Application Priority Data

Feb. 6, 1984 [JP] Japan .................................. 59-18258
Feb. 18, 1984 [JP] Japan .................................. 59-29219

[51] Int. Cl.$^4$ .............................................. G11B 7/00
[52] U.S. Cl. .................................... 369/46; 369/109; 369/111
[58] Field of Search ..................................... 369/44–46, 369/109, 111, 112; 290/201 AF, 201 DF; 350/162.17

[56] References Cited

U.S. PATENT DOCUMENTS

| | | | |
|---|---|---|---|
| 3,281,151 | 10/1966 | Kaprelian et al. | 369/108 X |
| 4,001,493 | 1/1977 | Cone | 369/102 X |
| 4,006,292 | 2/1977 | Schaefer | 369/111 X |
| 4,243,850 | 1/1981 | Edwards | 369/109 X |
| 4,346,471 | 8/1982 | Hirasawa et al. | 369/44 |
| 4,393,489 | 7/1983 | Mehrotra | 358/343 X |
| 4,399,329 | 8/1983 | Wharton | 358/343 X |
| 4,459,690 | 7/1984 | Corsover et al. | 369/46 X |
| 4,498,159 | 2/1985 | Daimon | 369/44 |
| 4,504,939 | 3/1985 | Eberly | 369/46 |
| 4,532,522 | 7/1985 | Tsunoda et al. | 369/46 X |
| 4,550,249 | 10/1985 | Damen et al. | 369/46 X |
| 4,571,712 | 2/1986 | Romano et al. | 369/46 X |

FOREIGN PATENT DOCUMENTS

| | | | |
|---|---|---|---|
| 13123 | 5/1978 | Japan . | |
| 55-113139 | 9/1980 | Japan | 369/46 |
| 57-018033 | 1/1982 | Japan . | |
| 57-018034 | 6/1982 | Japan | 369/44 |
| 58-100237 | 6/1983 | Japan | 369/46 |
| 58-137144 | 8/1983 | Japan | 369/44 |
| 198540 | 11/1984 | Japan . | |
| 2151355 | 7/1985 | United Kingdom | 369/46 |

Primary Examiner—Aristotelis M. Psitos
Attorney, Agent, or Firm—Gerald J. Ferguson, Jr.; Michael P. Hoffman; Michael J. Foycik, Jr.

[57] ABSTRACT

An optical data reproducing device including an illuminating system for respectively, simultaneously illuminating at least two separate tracks of an optical disk with at least two light beams; a photo-electric conversion device for respectively converting the at least two light beams reflected from the tracks into at least two electrical signals; and processing circuitry for processing the at least two electrical signals. The processing circuitry may include a switch for switching from one track to another to execute a trick jump play. This circuitry may also simultaneously read the track outputs. One or more diffraction gratings which may be perpendicularly oriented with respect to each other establish the beams projected on the tracks.

21 Claims, 15 Drawing Figures

OPTICAL DATA REPRODUCING DEVICES HAVING IMPROVED TRICK PLAY CAPABILITY

BACKGROUND OF THE INVENTION

1. Field of the Invention

This invention relates to optical data reproducing devices for video disks or digital audio disks.

2. Discussion of Prior Art

A first conventional optical data reproducing device is shown in FIGS. 1 through 3. In these figures, reference numeral 1 designates a light source such as a semiconductor laser. A laser beam from the semiconductor laser 1 is converted into a parallel beam by a collimator lens 2. The parallel beam is split into three beams by a diffraction grating 3. The beams are passed through a polarization beam splitter 4 which is sometimes referred to hereafter as a separating optical system. The beams are then converted into circularly polarized beams by a quarter-wave plate 5 and then applied to an objective 6. As a result, beams 10a, 10b and 10c are focused on pits 7a of an optical disk 7. The collimator lens 2, diffraction grating 3, quarterwave plate 5 and objective 6 of the optical system are sometimes referred to hereafter as a focusing optical system. The beams 10a, 10b and 10c are reflected by optical disk 7. The beams thus reflected, namely, read beams 12a, 12b and 12c, advancing along the optical path in the direction opposite to the direction in which the beams 10a, 10b and 10c are applied to optical disk 7, reach quarter-wave plate 5 through objective 6 where they are converted into linearly polarized beams. Since the linearly polarized beams are perendicular to the incident beams, they are reflected by polarization beam splitter 4. The beams thus reflected are applied through a focus detecting optical system 8 to a photo-electric conversion element 9. The photo-electric conversion element, as shown in FIG. 3, has three light receiving surfaces 9a, 9b and 9c where the middle light receiving surface 9b is divided into four parts. The read beams 12a, 12b and 12c are applied to the light receiving surfaces 9a, 9b and 9c, respectively. The optical signals are converted into electrical signals by the photo-electric conversion element 9. The difference between the outputs of the light receiving surfaces 9a and 9c is outputted, as a track error signal (hereinafter referred to as "a TE signal", when applicable), by a subtractor 13. The difference between the outputs of the diagonally opposite parts of the middle light receiving surface 9b (which is divided into four parts as described before) is outputted, as a focus error signal (hereinafter referred to as "an FE signal", when applicable), by a subtractor 14. On the other hand, the sum of the outputs of the four division parts of the light receiving surface 9b is outputted, as a reproduction signal (hereinafter referred to as "an RF signal", when applicable), by an adder 15. The output terminals of the subtractors 13 and 14 are connected to tracking and focus servo circuits (not shown). The outputs of these circuits operate an actuator, to perform tracking and focus servo operations. The output terminal of the adder 15 is connected to a signal processing circuit (not shown) which reproduces the data on the optical disk 7.

In the conventional optical data reproducing device, the light beam from the light source is split into three beams 10a, 10b and 10c by the diffraction grating 3 and the three beams are applied onto one track as shown in FIG. 2. Therefore, whenever a trick play jump is desired, it is necessary to apply the beams 10a, 10b and 10c to a different track, for instance, by moving the device itself radially of the optical disk 7. Accordingly, the speed of the trick play is limited to some degree. Moreover, it is impossible for the device to reproduce data on different tracks simultaneously.

In view of the foregoing, an object of this invention is to provide an optical data reproducing device in which a trick play jump can be performed instantaneously, the speed of the trick play can be increased, and data on different tracks can be reproduced simultaneously.

The foregoing object and other objects of the invention have been achieved in one detailed embodiment of the invention by the provision of an optical data reproducing device which comprises: a light source; a focusing optical system for focusing light beams from a light source onto an optical disk; a separating optical system provided on the optical path of the focusing optical system for separating light beams, which are reflected as optical signals from the optical disk, from the optical path; a photo-electric conversion element for receiving the light beams, which are separated from the optical path by the separating optical system, to convert the optical signals into electrical signals; and a circuit for processing the electrical signals from the photo-electric conversion element to perform data reproduction and various servo controls, the focusing optical system having a plurality of diffraction gratings which have at least two optical grating surfaces, the grating directions of which are substantially perpendicular to each other, the diffraction gratings being adapted to apply three light beams to each of at least two tracks on the optical disk and being disposed between the light source and the separating optical system and the photo-electric conversion element having at least two light receiving sections for receiving light beams reflected from the tracks.

Another conventional optical data reproducing device is shown in FIGS. 4 through 6 where common reference numerals in the figures refer to like parts. The parallel beam from collimator lens 2 is applied through polarization beam splitter 4 to quarter-wave plate 5, where it is converted into a circularly polarized beam. The beam is focused, as a beam 10, on a pit 7a a on optical disk 7 by an objective 6 as shown in FIG. 5. The assembly of the collimator lens 2, quarter-wave plate 5 and objective 6 may sometimes be referred to as "a focusing optical system". The beam reflected by optical disk 7 namely, a read beam 12, advancing along the optical path in the direction opposite to the direction in which the beam has advanced to the optical disk, reaches quarter-wave plate 5 through objective 6, so that it is converted into a linearly polarized beam. Since the linearly polarized beam is perpendicular to the incident beam, it is reflected by polarization beam splitter 4. The beam thus reflected is applied through focus detecting optical system 8 to photo-electric conversion element 9.

The photo-electric conversion element 9 has a four-division light receiving surface 11 consisting of four division surfaces 11a, 11b, 11c and 11d. The read signal 12 is applied to the four-division light receiving surface 11. As a result, a track error or TE signal, a focus error or FE signal and a data reproduction or RF signal are detected by a signal detecting circuit 25 connected to photo-electric conversion element 9. More specifically, in the division surfaces 11a and 11c, the optical signals are converted into electrical signals. The electrical signals outputted by division surfaces 11a and 11c are subjected to addition in a first adder 16. Electrical signals outputted by division surfaces 11b and 11d are subjected to addition in a second adder 17. The outputs of the two adders 16 and 17 are subjected to subtraction in a subtractor 18, so that the FE signal is provided at an output terminal 19. The sum of the outputs of all the division surfaces 11a through 11d is calculated by a third adder 20, so that the RF signal is provided at an output terminal 21. The sum of the outputs is subjected to time differentiation in a differentiation circuit 22. The output of the differentiation circuit 22 and the output of the subtractor 18 (which is the difference between the sum of the outputs of the division surfaces 11a and 11c and the sum of the outputs of the division surfaces 11b and 11d) are subjected to multiplication in a multiplier 23, so that the TE signal is provided at an output terminal 24.

The output terminals 19 and 24 are connected to a focus servo circuit and a tracking servo circuit (not shown). The outputs of these circuits operate an actuator, to perform the tracking servo control and the focus servo control. The output terminal 21 is connected to a signal processing circuit (not shown), to reproduce data on the optical disk 7.

In the above conventional optical data reproducing device, the beam 10 is applied to one track. Therefore, whenever a trick play jump is desired, it is necessary, for instance, to move the device itself radially of the optical disk 7 to cause the beam 10 to irradiate another track. Accordingly, the speed of the trick play is limited to some degree. Moreover, it is impossible for the device to reproduce the data of different tracks simultaneously. Thus, the prior art device of FIGS. 4 through 6 is subject to the same shortcomings as those of the device of FIGS. 1 through 3.

The above shortcomings have also been overcome in another detailed embodiment of the invention comprising: a light source; a focusing optical system for focusing light beams from the light source onto an optical disk, a separating optical system provided on the optical path of the focusing optical system for separating light beams from the optical path which are reflected as optical signals from the optical disk; a focus detecting optical system for receiving the reflected beams which are separated by the separating optical system to detect light beam focusing conditions on the optical disk; a photo-electric conversion element for receiving the reflected beams which have passed through the focus detecting optical system to convert the optical signals into electrical signals; and a circuit for processing the electrical signals from the photo-electric conversion element to perform data reproduction and various servo controls, the focusing optical system having a diffraction grating adapted to split a light beam from the light source into at least two beams which are projected onto two tracks on the optical disk, respectively and the diffraction grating being disposed between the light source and the separating optical system, the photoelectric conversion element including at least two light receiving sections which receive the light beams reflected from the tracks, respectively, the light receiving sections each having a four-division light receiving surface.

Other objects and advantages of this invention will be apparent from a reading of the following specification and claims taken with the drawing.

BRIEF DESCRIPTION OF THE DRAWING

FIG. 1 is a schematic block diagram of the device, FIG. 2 is an explanatory diagram showing the application of beams to an optical disk, and FIG. 3 is an explanatory diagram, partly as a block diagram, showing a circuit connected to a photo-electric conversion element.

FIG. 4 is a schematic block diagram of the device, FIG. 5 is an explanatory diagram showing the application of a beam to an optical disk, and FIG. 6 is an explanatory diagram, partly as block diagram, showing a signal detecting circuit connected to the photo-electric conversion element in FIG. 4.

FIG. 7 is a schematic block diagram of the device, FIG. 8 is a perspective view of illustrative diffraction gratings, FIG. 9 is an explanatory diagram showing the application of light beams to an optical disk, and FIG. 10 is a block diagram showing a part of the device.

FIG. 12 is a schematic block diagram of the device, FIG. 13 is an explanatory diagram showing the application of beams to an optical disk, and FIG. 14 is a block diagram showing a part of the device.

DETAILED DESCRIPTION OF PREFERRED EMBODIMENTS OF THE INVENTION

Figure 1:
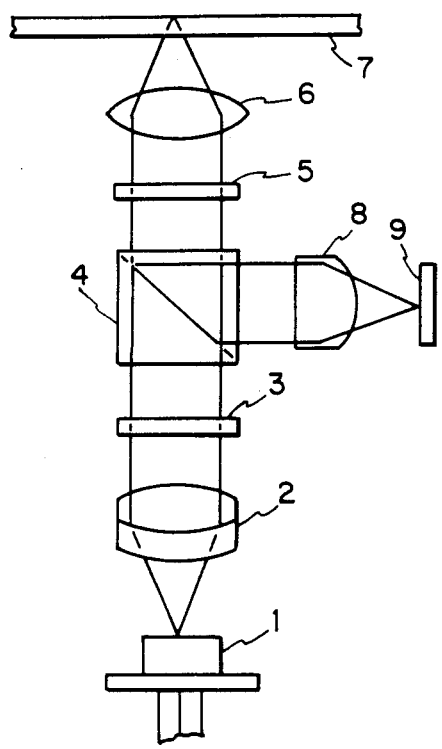
FIGS. 1 through 3 show a first conventional optical data reproducing device where
Figure 2:
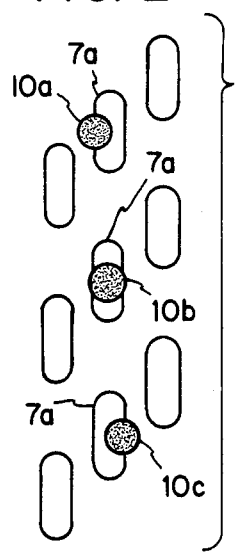
Figure 3:
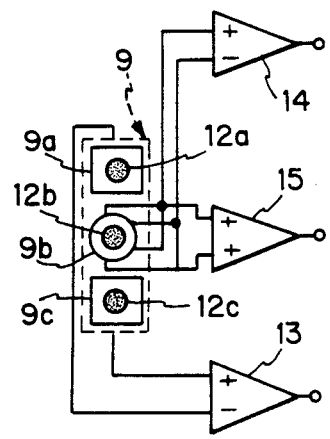

The invention will first be described with reference to its embodiments shown in FIGS. 7 through 11. In these figures, those components which have been previously described with reference to FIGS. 1 through 6 are designated by the same reference numerals or characters.

FIGS. 7 through 11 show a first embodiment of the invention.

In these figures, reference numeral 1 designates a semiconductor laser; 2, a collimator lens, and 4, a polarization beam splitter. Two diffraction gratings 26 and 27 are disposed between the polarization beam splitter 4 and the collimator lens 2.

Figure 9:
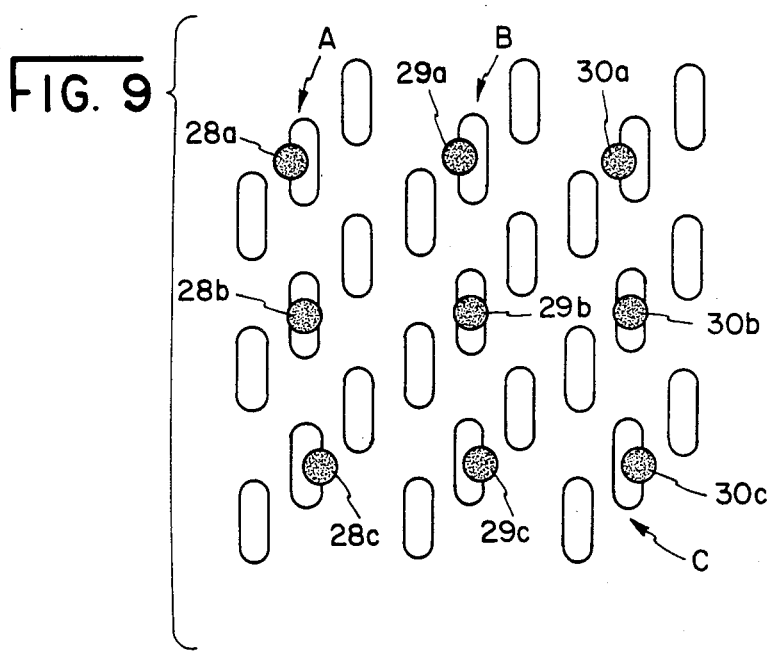

The lower surfaces of the diffraction gratings 26 and 27 are optical grating surfaces 26a and 27a, respectively. The diffraction gratings 26 and 27 are so arranged that the grating directions of the optical grating surfaces 26a and 27a are preferably perpendicular to each other. The beam is split into nine beams by these diffraction gratings 26 and 27, which are applied to the optical disk 7 as shown in FIG. 9. More specifically, three groups of beams 28a, 28b and 28c, 29a, 29b and 29c, and 30a, 30b and 30c are applied to different tracks A, B and C of the optical disk 7, respectively.

Figure 10:
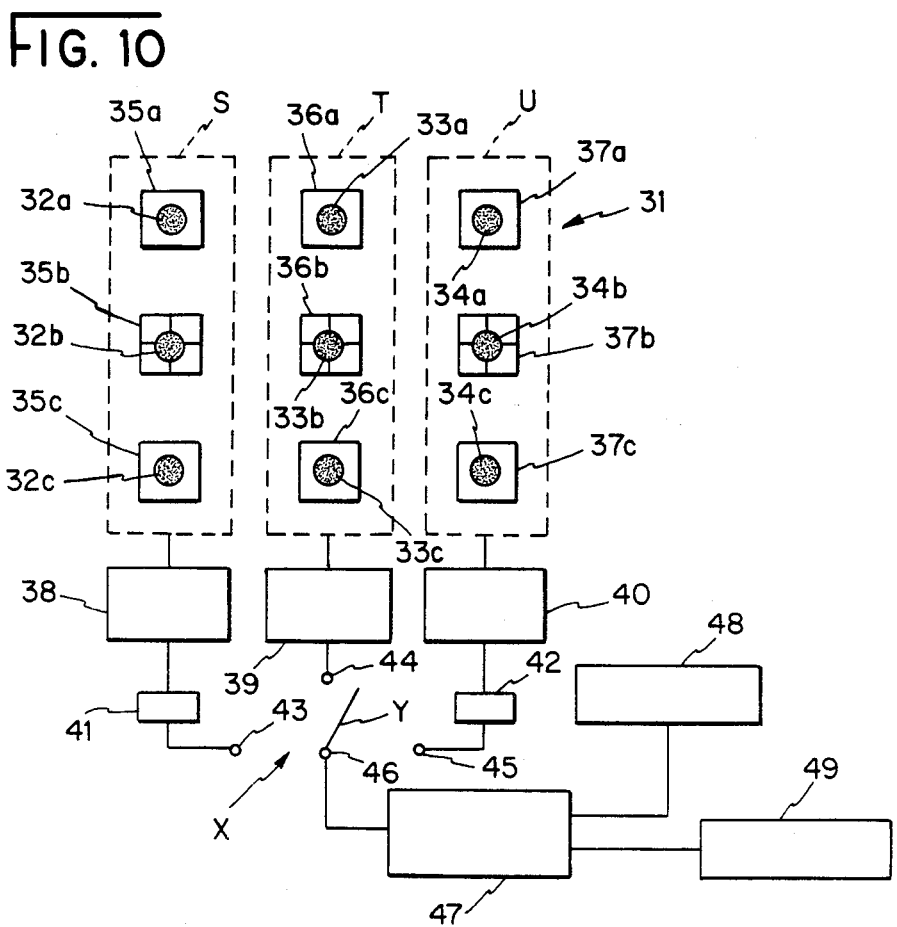

On the other hand, a photo-electric conversion element 31, as shown in FIG. 10, has three light receiving sections S, T and U for receiving three groups of read beams 32a, 32b and 32c, read beams 33a, 33b and 33c, and read beams 34a, 34b and 34c which have been reflected from the tracks A, B and C of the optical disk 7, respectively. The light receiving sections S, T and U are the same in arrangement as the conventional one; that is, they have light receiving surfaces 35a, 35b and 35c, light receiving surfaces 36a, 36b and 36c, and light receiving surfaces 37a, 37b and 37c, respectively. Each of the middle light receiving surfaces 35b, 36b and 37b of the light receiving sections S, T and U is divided into four parts. The light receiving sections S, T and U of the photo-electric conversion element 31 are connected to data reproduction and servo circuits, as described later. The light receiving sections S, T and U are connected to signal detecting circuits 38, 39 and 40, respectively, which are adapted to detect the TE, FE and RF signals. Each of the signal detecting circuits 38, 39 and 40 is equal in arrangement to that shown in FIG. 3, having subtractors and an adder (not shown). The signal detecting circuits 38 and 40 are connected to attenuators 41 and 42, respectively. The TE, FE and RF signals are provided at the output terminals 43, 44 and 45 of the attenuator 41, the signal detecting circuit 39 and the attenuator 42. The attenuators 41 and 42 may be connected respectively between the light receiving section S and the signal detecting circuit 38 and between the light receiving section U and the signal detecting circuit 40. A switch X is provided on the side of the output terminals 43, 44 and 45, i.e., on the output side of the signal detecting circuits 38, 39 and 40, to selectively receive the outputs of the signal receiving circuits 38, 39 and 40. The common terminal 46 of switch X is connected to a servo/RF forming circuit. The servo circuit and the RF forming circuit of the servo/RF forming circuit 47 are connected to an actuator 48 and a signal processing circuit 49, respectively.

The operation of the above optical data reproducing device will now be described. A laser beam from the semiconductor laser 1 is converted into a parallel beam by collimator lens 2. The beam is first split into three beams by the diffraction grating 26, similarly as in the conventional device. Then, each of the three beams is split into three beams by the diffraction grating 27. The resultant nine beams, namely, a first group of beams 28a, 28b and 28c, a second group of beams 29a, 29b and 29c and a third group of beams 30a, 30b and 30c are applied through polarization beam splitter 4, quarter-wave plate 5 and objective 6 to three tracks A, B and C on the optical disk 7, respectively, as shown in FIG. 9. Thereafter, these beams are reflected by the optical disk 7 and are applied through objective lens 6 and quarter-wave plate 5 to polarization beam splitter 4, where they are reflected. The beams thus reflected are applied through the focus detecting optical system 8 to the light receiving sections S, T and U of the photo-electric conversion element 31. When, under this condition, the armature Y of the switch X is connected to the output terminal 44, the read beams 33a and 33c received by the light receiving surfaces 36a and 36c of the light receiving section T are converted into electrical signals, respectively. The difference between the two electrical signals is calculated by the signal detecting circuit 39, so that the TE signal is provided. The fact that the signal has a positive or negative value means that the beams are not accurately applied to the track B. Accordingly, the TE signal is supplied to the servo/RF forming circuit 47, so that the actuator 48 is operated according to the value of the TE signal, to cause the beams to accurately follow the track B. The read beam 33b received by the light receiving surface 36b is also converted into an electrical signal. In this case, the difference between the electrical signals of the diagonally opposite parts of the light receiving surface 36b (which is divided into four parts) is calculated by the signal detecting circuit 39, so that the FE signal is provided. When the FE signal has a positive or negative value, the beam 29b is not focused on optical disk 7. Therefore, the FE signal is supplied to the servo/RF forming circuit 47, so that the actuator 48 is operated according to the value of the FE signal. Furthermore, the sum of the electrical signals of the four division parts of the light receiving surface 36b is calculated by the signal detecting circuit 39, so that the RF signal is produced. The RF signal is applied to the servo/RF forming circuit 47, and the output of the circuit 47 is applied to the signal processing circuit 49, so that the data of the track B of optical disk 7 is reproduced.

In order to perform a trick play jump under the above-described condition, the armature Y of the switch X is connected to the output terminal 43 or 45. As a result, the servo control and data reproduction of the track A or C is carried out similarly as in the above-described case. That is, the jump can be achieved instantaneously merely by operating the switch X.

In the above-described device, one beam is divided into a plurality of beams by two diffraction gratings. Therefore, the read beams 33a, 33b and 33c received by the light receiving section T are different in optical intensity from the read beams 32a, 32b and 32c received by the light receiving section S or the read beams 34a, 34b or 34c received by the light receiving section U. In order to compensate for the difference, the signal detecting circuits 38 and 40 are provided with attenuators 41 and 42, respectively, so that the output at the output terminal 44 of the light receiving section T is equal in level to the output at the output terminal 43 of the light receiving section S or the output at the output terminal 45 of the light receiving section U at all times. Accordingly, with any one of the light receiving sections S, T or U selected, the servo control and data reproduction are achieved with high accuracy.

The above-described device may be modified as follows: A servo circuit for inputting the TE and FE signals is provided on the output side of one of the signal detecting circuits 38, 39 and 40, and RF forming circuits for receiving the RF signals are connected to the signal detecting circuits 38, 39 and 40, respectively. In this modification, the TE and FE signals can be obtained from any one of the light receiving sections S, T and U, and the RF signals can be obtained from all of the light receiving sections S, T and U. Therefore, the data of the tracks A, B and C of the optical disk 7 can be reproduced simultaneously. If, in this case, attenuators are connected between the light receiving section S and the RF forming circuit and between the light receiving section T and the RF forming circuit, then the same effect as that of the above-described embodiment can be obtained.

Figure 11:
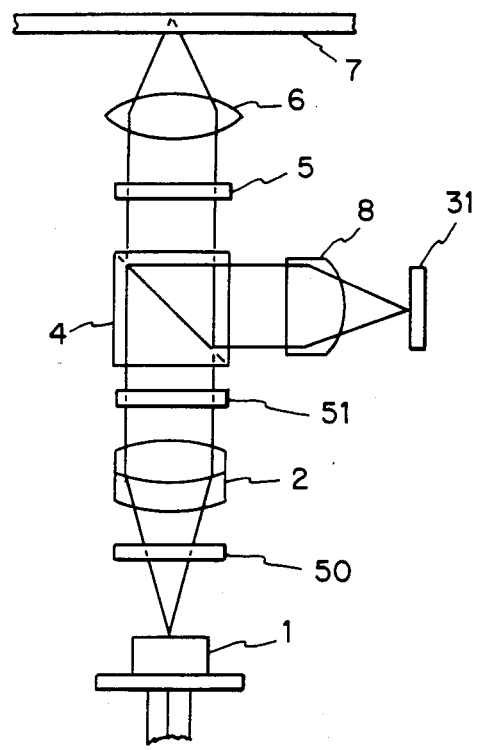
FIG. 11 is a schematic block diagram of a modification of the embodiment of FIGS. 7 through 10.

FIG. 11 illustrates a modification of the embodiment of FIGS. 7 through 10. This modification is characterized by the arrangement of the diffraction gratings. That is, in the first embodiment, the diffraction gratings 26 and 27 are connected between the collimator lens 2 and the polarization beam splitter 4, while in the second embodiment, a diffraction grating 50 is connected between the semiconductor laser 1 and the collimator lens 2, and another diffraction grating 51 is connected between the collimator lens 2 and the polarization beam splitter. It goes without saying that the two diffraction gratings may be connected between the semiconductor laser 1 and the collimater lens 2.

The other arrangement and the operation of the FIG. 11 embodiment are the same as those of the firse embodiment.

In the above-described embodiments, one beam is split into nine beams and the nine beams are applied to three tracks (A, B and C); however, it is needless to say that the device may be so modified that one beam is split into six beams and the six beams are applied to two tracks. In the latter case, the photoelectric conversion element is one having two light receiving sections.

As is apparent from the above description, according to the invention, the light beams can be caused to jump from one track to another on an optical disk instantaneously without moving the optical data reproducing device, so that a trick play speed can be increased or the data of a plurality of tracks can be reproduced at the same time.

Figure 5:
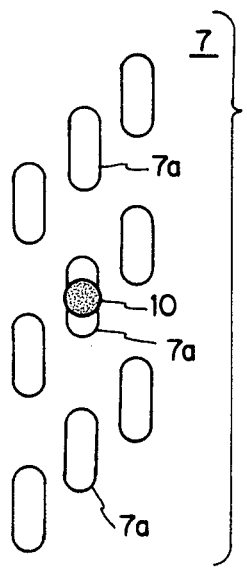
FIGS. 4 through 6 show a second conventional optical data reproducing device where
Figure 4:
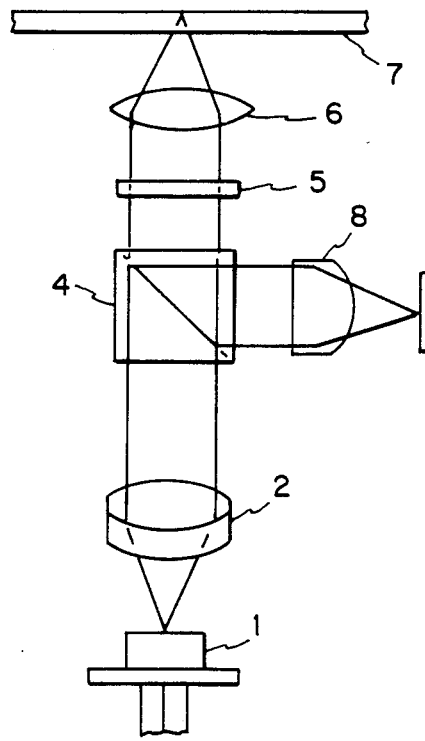
Figure 6:
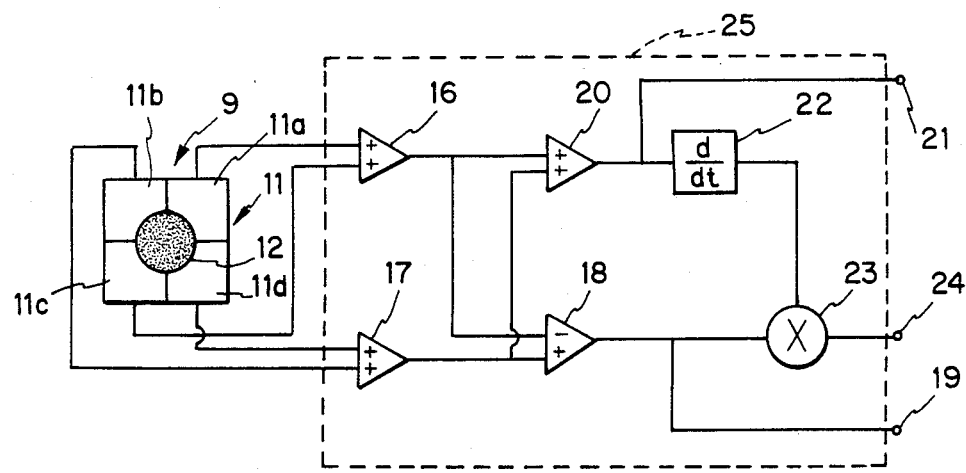
Figure 7:
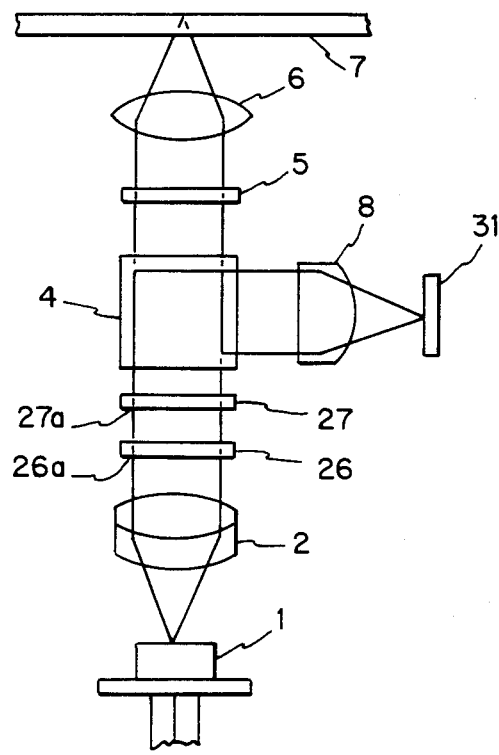
FIGS. 7 through 10 show a first illustrative embodiment of an optical data reproducing device according to the invention where
Figure 8:
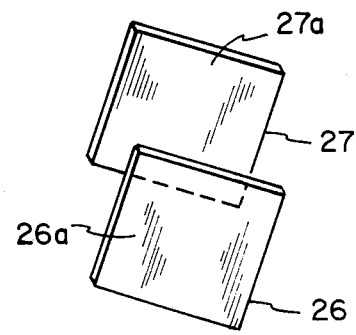

A second embodiment of the invention will now be described with reference to FIGS. 12 through 15. In these figures, those components which have been previously described with reference to FIGS. 4 through 6 are designated by the same reference numerals or characters.

In these figures, a reference numeral 1 designates a semiconductor laser; 2, a collimator lens; and 4, a polarization beam splitter. A diffraction grating 52, which is a part of the focusing optical system, is disposed between polarization beam splitter 4 and the collimator lens 2.

Figure 13:
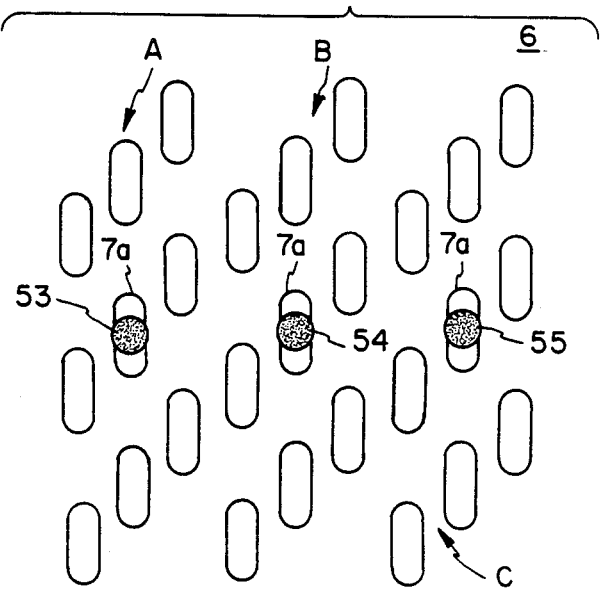

The diffraction grating 52 has an optical grating surface 52a adapted to split a laser beam from the semiconductor laser 1 into three beams 53, 54 and 55. The three beams are applied to three tracks A, B and C on the optical disk 7 as shown in FIG. 13.

On the other hand, a photo-electric conversion element 56 has three light receiving sections S, T and U which have four-division light receiving surfaces 57, 58 and 59 to receive read beams 60, 61 and 62, respectively, which are reflected from the tracks A, B and C, respectively.

The light receiving sections S, T and U of the photoelectric conversion element are connected to data reproduction and servo circuits, as described later. That is, the light receiving sections S, T and U are connected to signal detecting circuits 38, 39 and 40, respectively, which are adapted to detect the TE, FE and RF signals. Each of the signal detecting circuits 38, 39 and 40 is equal in construction to the conventional one shown in FIG. 6, having the subtractor, the adder, the differentiation circuit and the multiplier. The signal detecting circuits 38 and 40 are connected to attenuators 41 and 42, respectively. The TE, FE and RF signals can be provided at the output terminals 43, 44 and 45 thereof. The attenuators 41 and 42 may be connected respectively between the light receiving section S and the signal detecting circuit 38 and between the light receiving section U and the signal detecting circuit 40. A switch X is provided on the side of the output terminals 43, 44 and 45, i.e., on the output side of the signal detecting circuits 38, 39 and 40, to selectively receive the outputs of the signal receiving circuits 38, 39 and 40. The common terminal 46 of the switch X is connected to a servo/RF forming circuit 47 including a servo circuit and an RF forming circuit. The servo circuit is connected to an actuator 48, and the RF forming circuit is connected to a signal processing circuit 49.

Figure 14:
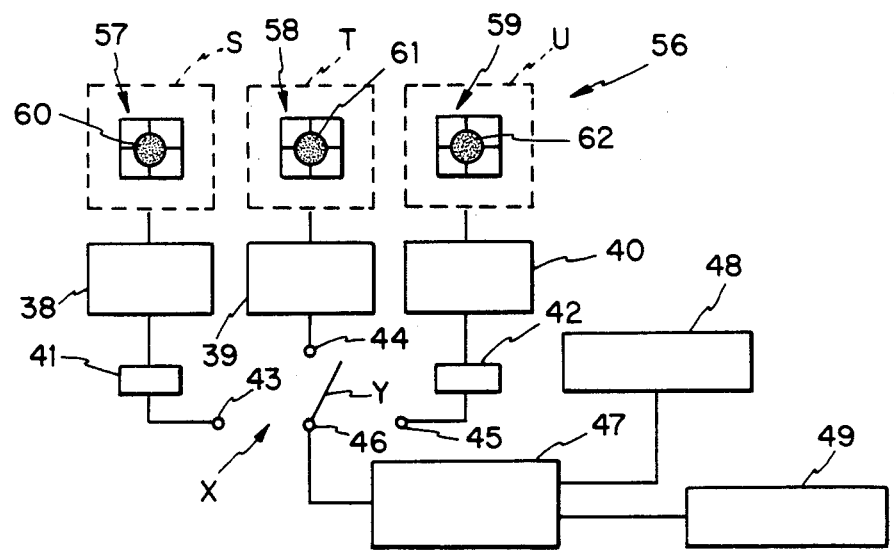

The operation of the above described second embodiment will now be described. A laser beam from the semiconductor laser 1 is converted into a parallel beam by the collimator lens 2. The beam is split into three beams by the optical grating surface 52a of the diffraction grating 52. The three beams are applied through the polarization beam splitter 4, the quarterwave plate 5 and the objective 6 to the optical disk 7. That is, the beams 53, 54 and 55 are projected onto three different tracks A, B and C on the optical disk 7, respectively, as shown in FIG. 13. Thereafter, the beams are reflected by the optical disk 7 and are applied through the objective 6 and the quarter-wave plate 5 to the polarization beam splitter 4, where they are reflected. The beams thus reflected are applied through the focus detecting optical system 8 to the four-division light receiving surfaces 57, 58 and 59 of the light receiving section S, T and U in the photo-electric conversion element 56, respectively, as shown in FIG. 14. When, under this condition, the armature Y of the switch X is connected to the output terminal 44, the optical signals of the read beam 61 received by the four-division light receiving surface 58 are converted into electrical signals, and the signal detecting circuit 39 detects the TE, FE and RF signals, similarly as in the conventional device. The outputs of the signal detecting circuit 39 are applied to the servo/RF forming circuit 47. As a result, the output of the servo circuit in the servo/RF forming circuits 47 drives the actuator 48 to perform the tracking servo control so that the track B is followed accurately, and to perform the focusing servo control so that the beam is accurately focused on the pit 7a. On the other hand, the output of the RF forming circuit in the servo/RF forming circuit 47 is applied to the signal processing circuit 49, so that the data of the track B of the optical disk 7 is reproduced.

In order to perform a trick play jump under the above-described condition, the armature Y of the switch X is tripped over to the output terminal 43 or 45. As a result, the servo control and data reproduction of the track A or C are carried out similarly as in the above-described case. That is, the jump can be achieved instantaneously merely by operating the switch X.

In the above-described device, one beam is divided into a plurality of beams by the diffraction grating 52. Therefore, the read beams 60 and 62 received by the light receiving sections S and U are different in optical intensity from the read beam 61 received by the light receiving section T. In order to compensate for the difference, the signal detecting devices 38 and 40 are provided with attenuators 41 and 42, so that the output provided at the output terminal 44 of the light receiving section T is made equal in level to the output at the output terminal 43 of the light receiving section S and the output at the output terminal 44 of the light receiving section U. Accordingly, with any one of the light receiving sections S, T and U selected, the servo control and data reproduction are achieved with high accuracy.

The above-described device may be modified as follows: A servo circuit for inputting the TE and FE signals is provided on the output side of one of the signal detecting circuits 38, 39 and 40, and RF forming circuits for receiving the RF signals are connected to the signal detecting circuits 38, 39 and 40, respectively. In this modification, the TE and FE signals can be obtained from any one of the light receiving sections S, T and U, and the RF signals can obtained from all of the light receiving sections S, T and U. Therefore, the data of the tracks A, B and C on the optical disk 7 can be reproduced simultaneously. If, in this case, attenuators are connected between the light receiving section S and the RF forming circuit and between the light receiving section U and the RF forming circuit, then the same effect as that of the above-described device can be obtained.

Figure 12:
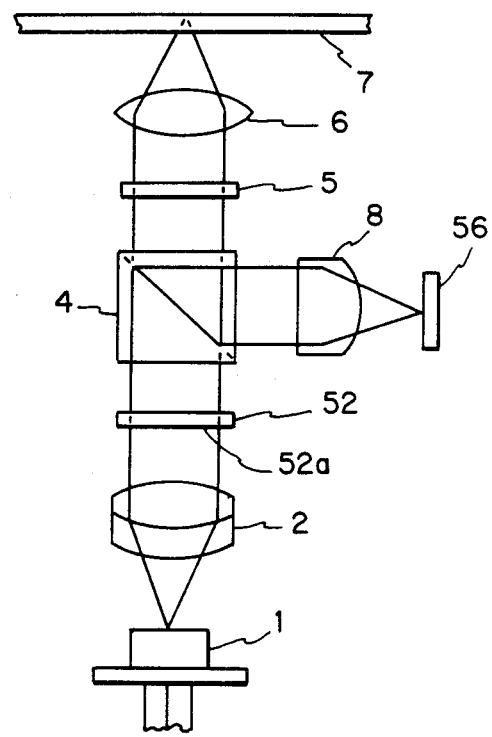
FIGS. 12 through 14 show a second illustrative embodiment of an optical data reproducing device according to this invention where
Figure 15:
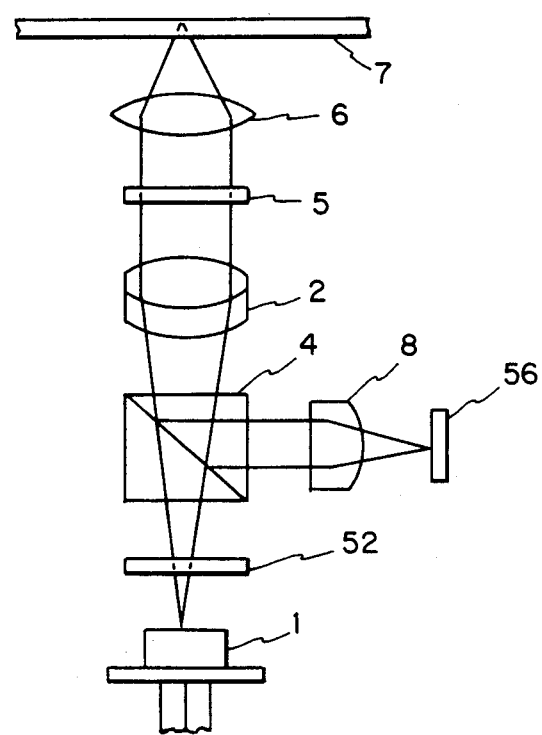
FIG. 15 is a schematic block diagram of a modification of the embodiment of FIGS. 12 through 14.

FIG. 15 illustrates a modification of the embodiment of FIGS. 12 through 14. In this modification, the collimator lens 2 is disposed between the polarization beam splitter 4 and the quarter-wave plate 5, and the diffraction grating 52 is arranged between the semiconductor laser 1 and the polarization beam splitter 4. The operation and effect of this modification is the same as that of the second embodiment of FIGS. 12 through 14.

As is apparent from the above-described examples, the diffraction grating 52 can be disposed at any position between the semiconductor laser 1 and polarization beam splitter 4.

In the above-described examples, one beam is split into three beams by the diffraction grating 52, and the three beams are projected onto three tracks A, B and C, respectively. However, it goes without saying that the device may be so modified that one beam is split into two or four beams, which are applied to two or four tracks. In such a modification, the photoelectric conversion element should have two or four light receiving sections.

As is apparent from the above description of the embodiments of FIGS. 12 through 15, the beam can be caused to jump from one track to another on an optical disk instantaneously without moving the optical data reproducing device, so that trick play speed can be increased or the data of a plurality of tracks can be reproduced simultaneously.

It is to be understood that the above detailed description of the various embodiments of the invention is provided by way of example only. Various details of design and construction may be modified without departing from the true spirit and scope of the invention as set forth in the appended claims.

What is claimed is:

1. An optical data reproducing device comprising
   illuminating means for respectively, simultaneously illuminating at least two continuous separate concentric or spiral data tracks of an optical disk with at least two light beams;
   photo-electric conversion means for respectively converting said at least two light beams reflected from said concentric or spiral data tracks into at least two data reproduction electrical signals respectively representative of the entirety of the information recorded at said two tracks;
   processing means for processing at least one of said data reproduction electrical signals whereby both of said data reproduction electrical signals are available for processing either simultaneously or selectively; and
   where said processing means includes means for switching from one of said two data reproduction electrical signals to the other to provide said selective processing of said one of the two data reproduction electrical signals independent from the other data reproduction electrical signal.

2. A device as in claim 1 where said illuminating means includes a light source and a diffraction grating for splitting a light beam from the light source into said at least two beams.

3. A device as in claim 2 including focusing means for focusing said at least two light beams onto said tracks and a separating means for directing the said reflected beams from the optical path of the focusing means to said photo-electric conversion means.

4. A device as in claim 3 where said diffraction grating is disposed between said light source and said separating means.

5. A device as in claim 2 where said photo-electric conversion means includes at least two light receiving sections which respectively receive said at least two light beams reflected from said tracks, each said light receiving section having four separate light receiving surfaces.

6. A device as in claim 5 where said processing means includes (a) signal detecting circuits connected to said light receiving sections, respectively, to receive electrical signals from said light receiving sections, to detect at least one servo signal and a data reproduction signal, (b) said switching means being provided on the output side of said signal detecting circuits, to selectively obtain outputs from one of said signal detecting circuits, and (c) an output circuit connected to the output side of said switch responsive to said servo and data reproduction signals.

7. A device as in claim 6 where said processing means includes an attenuator connected between said switch and a predetermined one of said light receiving sections, to make outputs from said signal detecting circuits equal in level.

8. A device as in claim 2 where said processing means includes
   signal detecting circuits connected to said light receiving sections, respectively, to receive electrical signals from said light receiving section, to detect at least one servo signal and a data reproduction signal;
   a servo circuit connected to the output side of one of said signal detecting circuits to receive said servo signal; and
   RF forming circuits connected respectively to said signal detecting circuits to receive said data reproduction signals.

9. A device as in claim 8 where said processing means includes an attenuator connected between a predetermined one of said light receiving sections and said RF forming circuit, to make outputs from said signal detecting circuits equal in level.

10. A device as in claim 1 where said illuminating means respectively, simultaneously illuminates each of said at least two tracks with three of said light beams.

11. A device as in claim 10 where said illuminating means includes a light source and a plurality of diffraction gratings for splitting a light beam from the light source into said light beams.

12. A device as in claim 11 where there are two of said diffraction gratings, the grating directions of the grating surfaces of which are perpendicularly oriented with respect to each other.

13. A device as in claim 11 where said photoelectric conversion means includes at least two light receiving sections which each receive said at least three light beams reflected from said tracks.

14. A device as in claim 10 including focusing means for focusing said at least three light beams onto each of said tracks and a separating means for directing the said reflected beams from the optical path of the focusing means to said photo-electric conversion means.

15. A device as in claim 10 where said diffraction gratings are disposed between said light source and said separating means.

16. A device as in claim 13 where said processing means includes (a) signal detecting circuits connected to said light receiving sections, respectively, to receive electrical signals from said light receiving sections, to detect at least one servo signal and a data reproduction signal, (b) said switching means being provided on the output side of said signal detecting circuits, to selectively obtain outputs from one of said signal detecting circuits, and (c) an output circuit connected to the output side of said switch responsive to said servo and data reproduction signals.

17. A device as in claim 16 where said processing means includes an attenuator connected between said switch and a predetermined one of said light receiving sections, to make outputs from said signal detecting circuits equal in level.

18. A device as in claim 13 where said processing means includes signal detecting circuits connected to said light receiving sections, respectively, to receive electrical signals from said light receiving section, to detect at least one servo signal and a data reproduction signal;

a servo circuit connected to the output side of one of said signal detecting circuits to receive said servo signals; and RF forming circuits connected respectively to said signal detecting circuits to receive said data reproduction signals.

19. A device as in claim 18 where said processing means includes an attenuator connected between a predetermined one of said light receiving sections and said RF forming circuit, to make outputs from said signal detecting circuits equal in level.

20. An optical data reproducing device comprising:

a source of at least two light beams a focusing said optical system for respectively focusing at least two light beams from said light source onto at least two separate tracks of an optical disk;

a separating optical system provided on the optical path of said focusing optical system for separating light beams from said optical path which are reflected as optical signals from said optical disk;

a photo-electric conversion element for receiving said reflected beams which have passed through said focus detecting optical system, to convert said optical signals into at least two data reproduction electrical signals respectively representative of the entirety of the information recorded at said two tracks;

a circuit for processing said electrical signals from said photo-electric conversion element, to perform data reproduction and at least one servo control, said focusing optical system having a diffraction grating adapted to split a light beam from said light source into at least two beams which are projected onto two tracks on said optical disk, respectively, said diffraction grating being disposed between said light source and said separating optical system;

said photo-electric conversion element including at least two light receiving sections which receive said light beams reflected from said tracks, respectively, said light receiving sections each having four separate light receiving surfaces; and where said processing circuit includes means for switching from one of said two data reproduction electrical signals to the other to provide selective processing of said one of the two data reproduction electrical signals independent from the other data reproduction electrical signal.

21. An optical data reproducing device comprising:

a source of at least two light beams;

a focusing said optical system for respectively focusing at least two light beams from said light source onto at least two continuous separate concentric or spiral data tracks of an optical disk;

a separating optical system provided on an optical path of said focusing optical system, for separating light beams from said optical path which are reflected as optical signals by said optical disk;

a photo-electric conversion element for receiving said reflected beams which are separated from said optical path by said separating optical system, to convert said optical signals into at least two data reproduction electrical signals respectively representative of the entirety of the information recorded at said two tracks; and a circuit for processing said electrical signals from said photo-electric conversion element, to perform data reproduction and various servo controls;

said focusing optical system having a plurality of diffraction gratings which have at least two optical grating surfaces the grating directions of which are substantially perpendicular to each other, said diffraction gratings applying three light beams to each of at least two concentric or spiral data tracks on said optical disk and provided between said light source and said separating optical system where each of said three light beams includes one of said at least two light beams from said light source;

said photo-electric conversion element having at least two light receiving sections for receiving light beams reflected from said tracks; and where said processing means includes means for switching from one of said two data reproduction electrical signals to the other to provide for selective processing of one of the two data reproduction electrical signals independent from the other data reproduction electrical signal.

* * * * *